United States Patent Office 3,444,253
Patented May 13, 1969

3,444,253
ADDITION REACTIONS OF BUTADIENE CATALYZED BY COPPER (I) ZEOLITES
Hans K. Reimlinger, Brussels, Ernest H. De Ruiter, Beersel, and Ulrich K. Kruerke, Brussels, Belgium, assignors to Union Carbide Corporation, a corporation of New York
No Drawing. Filed Sept. 20, 1967, Ser. No. 669,302
Int. Cl. C07c *3/60, 3/10*
U.S. Cl. 260—666    2 Claims

ABSTRACT OF THE DISCLOSURE

There is disclosed the reaction of butadiene with acetylene to produce 1,4-cyclohexadiene, and the dimerization of butadiene to produce 4-vinylcyclohexene, both reactions being catalyzed by copper (I) zeolites.

---

The invention relates to a catalytic process for addition reactions of butadiene. In one aspect, the invention relates to a process wherein the reaction of butadiene with acetylene to form 1,4-cyclohexadiene is catalyzed with copper (I) zeolite. In another aspect, the invention relates to a process wherein the dimerization of butadiene to form 4-vinylcyclohexene is catalyzed with copper (I) zeolite.

The nature and preparation of copper (I) zeolites wherein the copper is in the form of cuprous cations are disclosed and claimed in the copending application of Ulrich K. Kruerke, Ser. No. 669,290, filed on Sept. 20, 1967. The present invention relates to the use as catalysts of copper (I) zeolite X and copper (I) zeolite Y.

In the first aspect of the invention, butadiene is reacted with acetylene in the presence of copper (I) zeolite X to produce 1,4-cyclohexadiene. The overall reaction:

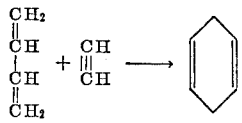

appears at first to be a Diels-Alder reaction. However, apparently the mechanism of the reaction differs from that of a Diels-Alder reaction as is illustrated by the fact that Diels-Alder reactions usually proceed with heat alone and are rarely catalyzed. The reaction of butadiene with acetylene to form 1,4-cyclohexadiene has not been previously reported.

In this aspect of the invention, copper (I) zeolite X is used as the catalyst. The catalyst can be prepared either by ion exchange (for example, an ion exchange between a solution of cuprous iodide in liquid ammonia and sodium zeolite X) or by reduction of copper (II) zeolite X with carbon monoxide, ammonia, an olefinic hydrocarbon, or an acetylenic hydrocarbon. In fact, one way to carry out the process is to start with copper (II) zeolite X which is first reduced by the butadiene and/or acetylene to copper (I) zeolite X, which then catalyzes the reaction.

The reaction of butadiene with acetylene in the presence of copper (I) zeolite X is carried out at elevated temperatures for a period of time sufficient to produce 1,4-cyclohexadiene. The reaction temperature employed will usually be within the range of from about 70° to about 170° C., although temperatures below and above this range can also be used in some cases. The reaction time can vary widely since the process can be carried out either as a continuous process or as a batch process. Thus, reaction times of a few minutes up to twenty-four hours or more can be employed.

There are several different ways that can be used to carry out the reaction. For instance, one way is a continuous, gas-phase process wherein the mixture of butadiene and acetylene is passed through a bed of copper (I) zeolite X. The catalyst can be in the form of powder or pellets, and the bed can be fixed or fluidized. An inert material can be mixed with the catalyst, if desired. Known types of reaction equipment can be used. The pressure can be atmospheric, sub-atmospheric, or super-atmospheric, although atmospheric is usually more convenient. In this method, some dimerization of butadiene to 4-vinylcyclohexene usually occurs. This is not necessarily undesired since 4-vinylcyclohexene is also a very useful product that is easily separated from 1,4-cyclohexadiene.

The reaction between acetylene and butadiene can also be carried out as a batch process. An autoclave is suitable for use in this case since super-atmospheric pressure of, for instance, up to 100 atmospheres is usually used. An inert, non-polar diluent such as benzene, n-octane, cyclohexane, ethers, and the like is preferred in order to act as a dispersing medium for the catalyst. The catalyst can be in the form of powder or pellets, and an inert solid filler or extender can be used, if desired. During the reaction, it is desirable to agitate the reaction vessel in order to facilitate contact of the reactants and catalyst. This method normally produces a mixture of 1,4-cyclohexadiene and 4-vinylcyclohexene.

A third method for carrying out the reaction of butadiene and acetylene is a continuous liquid-phase reaction. This method is carried out by continuously charging the mixture of acetylene and butadiene into a slurry of copper (I) zeolite X in a high boiling solvent, while continuously boiling off the solvent. The solvent vapors carry out the product 1,4-cyclohexadiene as well as unreacted starting material. After separation of the product by conventional means such as fractional distillation, the solvent and unreacted starting materials can be recycled. Solvents having a boiling point in excess of 100° C. are preferred in this method. Specific examples include toluene, xylene, n-octane, mesitylene, dibutyl ether, and other inert, non-polar organic liquids.

It has been found that this procedure produces only 1,4-cyclohexadiene, with no significant quantities of 4-vinyl-cyclohexene being produced as a by-product. Again, the catalyst can be in the form of powder or pellets, and inert fillers or extenders can be used if desired. Atmospheric pressure is usually used for this procedure, although super-atmospheric pressure can be used if desired.

The molar ratio of butadiene:acetylene in all cases can vary over a fairly wide range. Usually, at least stoichiometric amounts of butadiene are used, for instance, molar ratios of butadiene: acetylene of from 1:1 to 10:1 can be used.

The product 1,4-cyclohexadiene can be recovered in all cases by conventional methods, such as by fractional distillation. During the process, it is desirable to exclude moisture and oxygen from the reaction mixture in order to prevent de-activation of the catalyst.

The second aspect of the invention comprises the dimerization of butadiene in the presence of copper (I) zeolite X or copper (I) zeolite Y. The dimerization reaction is the following:

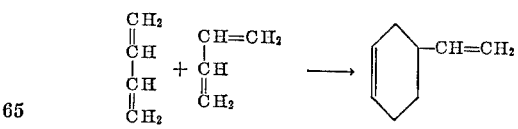

The advantage of this aspect of the invention is that the reaction produces 4-vinylcyclohexene with a minimum of side reactions such as production of polymers of butadiene. The process is carried out simply by contacting butadiene with the catalyst. The catalyst can be either copper (I) zeolite X or copper (I) zeolite Y. The catalyst can be prepared either by ion exchange (e.g., ion exchange between sodium zeolite X or Y with cuprous iodide in liquid ammonia), or by the reduction of copper (II) zeolite X or Y with carbon monoxide, ammonia, an acetylenic hydrocarbon, or an olefinic hydrocarbon. The use of a copper (I) zeolite prepared by reduction of a copper (II) zeolite is less preferred because this type of zeolite (a partially "decationized" zeolite) is poisoned relatively rapidly in this process. Copper (I) zeolite Y is most preferred.

The process of the second aspect of the invention can be carried out in several ways, including the three general procedures that were discussed with respect to the first aspect of the invention. Thus, the butadiene dimerization can be carried out as a continuous process in the gas phase or in the liquid phase, or as a batch process. The procedures are analogous to those discussed above with respect to the first aspect of the invention. The butadiene dimerization can be carried out at temperatures within the range of room temperature up to about 150° C., and preferably from about 60° to about 80° C. At lower temperatures, the reaction becomes uneconomically slow, and at higher temperatures the incidence of side reactions leading to products which block the active sites in the catalyst begins to become noticeable.

The 4-vinylcyclohexene product is recovered from the reaction mixture by standard procedures, such as by fractional distillation, or the like.

Both 1,4-cyclohexadiene and 4-vinylcyclohexene are useful products. For instance, they can both be epoxidized by standard epoxidizing agents such as peracetic acid to give useful diepoxides that can be used in the preparation of plastic articles by known methods.

The examples below illustrate the practice of the invention.

EXAMPLE 1

A Pyrex tube of 2 centimeters was filled with a catalyst bed 15 centimeters in height. The catalyst bed consisted of 3 grams of the zeolite catalyst and 60 grams of sand. The feed stream was passed through the catalyst bed at atmospheric presure and the products were collected in an ice-cooled trap.

(a) Copper (II) X zeolite was used as the catalyst. Butadiene was passed through the reactor at a rate of 3 liters/hour at 100° C. Initially, no product other than butadiene was collected. The catalyst gradually changed color from blue to grey, indicating reduction to copper (I) X zeolite. Vinylcyclohexene began to appear in the product until after 12 hours, a steady production of 2 to 2.5 grams/hour of vinylcyclohexene was observed. This experiment demonstrates that copper (I) zeolite X, not copper (II) zeolite X, is catalytically active in promoting the dimerization of butadiene to 4-vinylcyclohexene.

(b) In this experiment, copper (I) zeolite Y obtained by ion exchange from cuprous iodide in liquid ammonia was used as the catalyst. Butadiene was passed through the bed and dimerization to 4-vinylcyclohexene occured at room temperature. At 100° C. and a feed rate of 4 to 5 liters of butadiene per hour, 10 grams/hour of vinylcyclohexene were obtained which indicated substantially quantitative dimerization in a single pass.

(c) When copper (I) zeolite X obtained by ion exchange from cuprous iodide in liquid ammonia solution is used as the catalyst, the results are similar to those described in (a) above.

EXAMPLE 2

In this example, the equipment and procedure were substantially identical to that described in Example 1.

(a) The catalyst used was copper (I) zeolite X prepared by ion exchange with cuprous iodide in liquid ammonia. The catalyst bed was heated to 100° C. Initially, nitrogen was passed through the catalyst. Gradually, a 2:1 (molar) mixture of butadiene:acetylene was introduced in the inlet stream while gradually reducing the proportion of nitrogen. Finally, after 1 hour only the butadiene/acetylene mixture was passed through at the rate of 5 liters/hour.

After 6 hours, 2.8 grams of liquid was collected which contained 80 percent by weight of 1,4-cyclohexadiene and 20 percent of 4-vinylcyclohexene. During the first hour, only 1,4-cyclohexadiene was produced as was shown by vapor phase chromatographic analysis.

(b) In this experiment, the catalyst was copper (I) zeolite X prepared by reduction of copper (II) zolite X with carbon monoxide. During 4 hours, 20 liters of a 2:1 (molar) mixture of butadiene-acetylene together with 4 grams of water vapor was passed through the catalyst bed at about 100° C. After this time, 8 grams of 1,4-cyclohexadiene was collected containing only traces of vinylcyclohexene.

Without the water vapor, the same catalyst produced 4 grams of a 2:1 mixture of vinylcyclohexene and 1,4-cyclohexadiene.

EXAMPLE 3

An autoclave was charged with 3 grams of copper (I) zeolite X prepared by reduction of copper (II) zeolite X with butadiene at 110° C. for 24 hours. 100 milliliters of toluene and 0.4 mole each of butadiene and acetylene were added. The autoclave was heated to 100° C. for 12 hours. After this time, 9 grams of 1,4 - cyclohexadiene and 12 grams of 4-vinylcyclohexene were recovered.

EXAMPLE 4

Copper (I) zeolite X (8.6 grams) prepared by ion exchange from cuprous iodide and liquid ammonia was slurried in 100 milliliters of octane in a three-necked flask equipped with stirrer, gas inlet tube, and declining condenser. Butadiene (3 liters/hour) and acetylene (1.5 liters/hour) were passed through a drying column and introduced at room temperature into the stirred slurry. On heating, the grey zeolite turned to orange near 50° C. At about 120° C., a slow distillation of the solvent began. The solvent was distilled at the rate of 15–20 grams per hour over a period of 30 hours, during which time the solvent removed was replaced once each hour. The zeolite slowly darkened to brown. Initially, the rate of production of 1,4-cyclohexadiene was 480 milligrams/hour. At the end of the period, the rate of production was 200 milligrams per hour. A total of 9.1 grams of 1,4-cyclohexadiene was produced. No vinylcyclohexene was produced, as determined by vapor phase chromatographic analysis.

What is claimed is:

1. Process which comprises contacting butadiene with a catalyst selected from the group consisting of copper (I) zeolite X and copper (I) zeolite Y at a temperature and for a period of time sufficient to produce 4-vinylcyclohexene.

2. Process which comprises contacting a mixture of butadiene and acetylene with the catalyst, copper (I) zeolite X, at a temperature and for a period of time sufficient to produce 1,4-cyclohexadiene.

References Cited

UNITED STATES PATENTS

| | | | |
|---|---|---|---|
| 3,104,270 | 9/1963 | Mattox | 260—683.15 |
| 3,013,985 | 12/1961 | Breck. | |
| 2,431,403 | 11/1947 | Johnson. | |
| 2,544,808 | 3/1951 | Stahly. | |
| 1,868,127 | 7/1932 | Winkler. | |
| 3,236,762 | 2/1966 | Rabo | 208—111 |
| 2,352,606 | 7/1944 | Alder | 260—617 |

DELBERT E. GANTZ, *Primary Examiner.*

V. O'KEEFE, *Assistant Examiner.*

U.S. Cl. X.R.

252—455